(12) United States Patent
Bao et al.

(10) Patent No.: US 7,664,176 B2
(45) Date of Patent: Feb. 16, 2010

(54) METHOD AND SYSTEM FOR ENTROPY DECODING FOR SCALABLE VIDEO BIT STREAM

(75) Inventors: Yiliang Bao, Irving, TX (US); Marta Karczewicz, Irving, TX (US); Justin Ridge, Irving, TX (US)

(73) Assignee: Nokia Corporation, Espoo (FI)

( * ) Notice: Subject to any disclaimer, the term of this patent is extended or adjusted under 35 U.S.C. 154(b) by 754 days.

(21) Appl. No.: 10/891,271

(22) Filed: Jul. 14, 2004

(65) Prior Publication Data

US 2006/0013302 A1  Jan. 19, 2006

Related U.S. Application Data

(63) Continuation-in-part of application No. 10/887,771, filed on Jul. 9, 2004.

(51) Int. Cl.
*H04N 7/12* (2006.01)
(52) U.S. Cl. .......................... 375/240.08; 375/240.12; 375/240.24; 375/240.25
(58) Field of Classification Search ............ 375/240.08, 375/240; 348/405
See application file for complete search history.

(56) References Cited

U.S. PATENT DOCUMENTS

| | | | |
|---|---|---|---|
| 6,031,872 A | 2/2000 | Han | |
| 6,043,846 A | 3/2000 | Shen et al. | |
| 6,097,842 A * | 8/2000 | Suzuki et al. | 382/232 |
| 6,111,913 A * | 8/2000 | Murdock et al. | 375/240.03 |
| 6,263,022 B1 | 7/2001 | Chen et al. | |
| 6,275,531 B1 | 8/2001 | Li | |
| 6,788,740 B1 | 9/2004 | van der Schaar et al. | |
| 6,895,052 B2 * | 5/2005 | Hanamura et al. | 375/240.03 |
| 7,336,837 B2 | 2/2008 | Ridge et al. | |

FOREIGN PATENT DOCUMENTS

| | | |
|---|---|---|
| CN | 1207228 A0 | 2/1999 |
| WO | WO 99/05649 A1 | 2/1999 |
| WO | WO-01/26381 A0 | 4/2001 |
| WO | WO 01/26381 A1 | 4/2001 |

OTHER PUBLICATIONS

Arithmetic Coding for Data Compression, Computing Practices, Jun. 1987, vol. 30, No. 6, Ian H. Witten, Radford M. Neal, and John G. Cleary, pp. 520-540.

* cited by examiner

*Primary Examiner*—Tung Vo
*Assistant Examiner*—Anner Holder
(74) *Attorney, Agent, or Firm*—Foley & Lardner LLP

(57) ABSTRACT

A method, program product and apparatus for decoding from a scalable bit stream the binarization results of a video sequence by selectively decoding syntax elements and avoiding redundancy in coding. The result is a decrease in the size of the compressed bit stream of an enhancement layer bit stream. It has been demonstrated that the compression efficiency equals that of a single, non-scalable video stream for some video sequences. These features may be achieved by determining whether a skipping flag in the base layer macro block of the video data is set, and decoding a skipping flag from an enhancement layer macro block of the video data, corresponding to the base layer macro block, only if the base layer macro block skipping flag is set.

50 Claims, 3 Drawing Sheets

METHOD AND SYSTEM FOR ENTROPY DECODING FOR SCALABLE VIDEO BIT STREAM

CROSS-REFERENCE TO RELATED APPLICATIONS

This application is a continuation-in-part of prior application Ser. No. 10/887,771, filed Jul. 9, 2004, entitled "METHOD AND SYSTEM FOR ENTROPY CODING FOR SCALABLE VIDEO CODEC," listing inventors Bao, et al. The prior application is owned by the assignee of this application and the prior application is incorporated herein by reference.

BACKGROUND OF THE INVENTION

A. Field of the Invention

The present invention is directed to the field of video coding and, more specifically, to scalable video coding.

B. Background

Conventional video coding standards (e.g. MPEG-1, H.261/263/264) involve encoding a video sequence according to a particular bit rate target. Once encoded, the standards do not provide a mechanism for transmitting or decoding the video sequence at a different bit rate setting to the one used for encoding. Consequently, when a lower bit rate version is required, computational effort must be devoted to (at least partially) decoding and re-encoding the video sequence.

In contrast, with scalable video coding, the video sequence is encoded in a manner such that an encoded sequence characterized by a lower bit rate can be produced simply through manipulation of the bit stream; in particular through selective removal of bits from the bit stream.

In U.S. patent application Ser. No. 10/797,467, one system was proposed to efficiently convert a video sequence to a binary representation that describes a video sequence progressively in quality, while the correlation within a frame or among frames is efficiently exploited. Other conversion schemes to produce binarization results of video sequences are also available.

The present invention focuses on the strategies used in decoding such binarization results from a bit stream, and in decoding such results from a bit stream. Particularly it focuses on coding the binarization results into a bit stream, and decoding such results from a bit stream, using context-based adaptive binary arithmetic coding. An even more specific scalable video decoder is developed based on H.264 with a Context-based Adaptive Binary Arithmetic Coding (CABAC) engine (ITU-T Recommendation, H.264, "Advanced video coding for generic audiovisual services", pre-published, May 30, 2003, also known as Advanced Video Coding (AVC), or MPEG-4 part-10).

SUMMARY OF THE INVENTION

This invention decreases the size of the compressed bit stream of the enhancement layer. In this invention, the term "enhancement layer" refers to data that improves the visual quality of previously encoded video data. When used with efficient predictive binarization algorithms, this invention codes video data into a bit stream, or alternatively decodes a previously coded bit stream, where said bit stream achieves very competitive compression efficiency by avoiding inclusion of any redundant information in the bit stream. For some video sequences, it has been demonstrated that the compression efficiency equals that of a single layer, i.e. non-scalable, video stream.

A particular design based on the H.264 CABAC entropy coding engine is also proposed. By its design, the CABAC entropy coding engine is not suitable for scalable video coding. This invention extends it in a manner such that it is suitable for scalable video coding. Thus, in addition to providing very good coding performance, the present invention requires only minor changes to H.264. The invention re-uses most coding contexts that have already been defined in H.264. The entire CABAC core arithmetic coder is not modified at all.

The present invention is directed to a method, program product and apparatus for decoding a scalable bit stream containing encoded binarization results of a video sequence, by selectively decoding syntax elements, where said bit stream has been created using a corresponding encoder such that the inclusion of redundant information in the bit stream is avoided. The result is a decrease in the size of the compressed bit stream of an enhancement layer.

One exemplary embodiment of the invention includes determining whether a skipping flag in the base layer macro block of video data is set, and encoding into a bit stream the macro block skipping flag of an enhancement layer macro block of the video data, corresponding to the base layer macro block, only if the base layer macro block is set to a particular value.

Another exemplary embodiment of the invention includes determining whether a skipping flag in the base layer macro block of video data is set, and decoding the macro block skipping flag of an enhancement layer macro block of the video data, corresponding to the base layer macro block, only if the base layer macro block is set to a particular value.

Another exemplary embodiment of the invention includes determining which of a plurality of blocks in a base layer macro block contain zero coefficients, generating a coded block pattern (CBP) of an enhancement layer macro block, where the CBP includes a number of digits equal to the number of blocks in said base layer macro block containing only zero coefficients, and then encoding the CBP of the enhancement layer into a bit stream.

Another exemplary embodiment of the invention includes determining which of a plurality of blocks in a base layer macro block contain zero coefficients, then decoding a coded block pattern (CBP) of an enhancement layer macro block, where the CBP includes a number of digits equal to the number of blocks in said base layer macro block containing only zero coefficients.

Another exemplary embodiment of the invention includes encoding into a bit stream a CBP value of a base layer macro block, and differentially encoding into a bit stream a CBP value of an enhancement layer macro block relative to the CBP of the base layer macro block.

Another exemplary embodiment of the invention includes decoding a CBP value of a base layer macro block and differentially decoding a CBP value of an enhancement layer macro block relative to the CBP of the base layer macro block.

Yet another exemplary embodiment of the invention includes determining the zero-value coefficients in a block of a base layer, determining whether any of the zero-coefficients become non-zero coefficients in a corresponding block in an enhancement layer, and encoding into a bit stream a coding block flag in an enhancement layer based on that determination.

A further exemplary embodiment of the invention includes determining the zero-value coefficients in a block of a base layer, determining whether or not to decode a coded block flag from an enhancement layer, then determining with or without the use of a decoded coded block flag whether any of the zero-valued base layer coefficients become non-zero coefficients in a corresponding block in an enhancement layer.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF EXEMPLARY EMBODIMENTS

Figure 1:
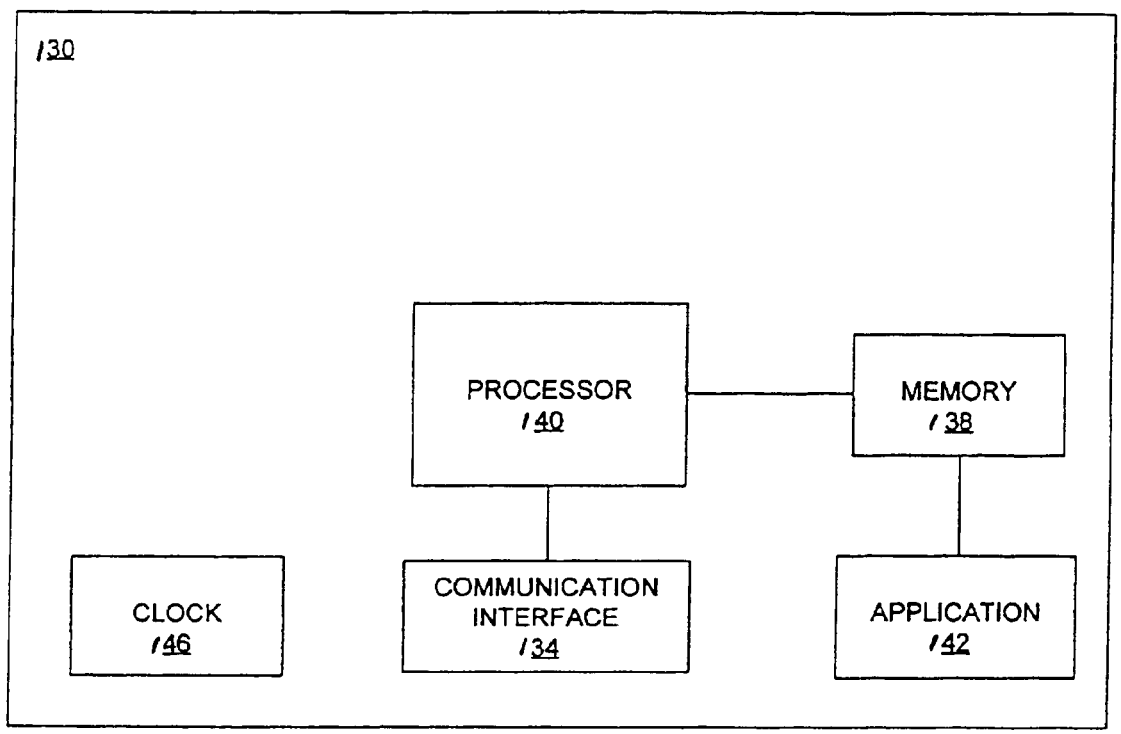
FIG. 1 illustrates a communications device employing the present invention.

Existing binarization algorithms, such as that presented in U.S. patent application Ser. No. 10/797,467, provide a very efficient description of the enhancement layer. There nonetheless remains strong correlation between the enhancement layer description and the previous base layer description.

An entropy coding scheme similar to that in the non-scalable codec could always be used, but this would result in information being coded into a bit stream or subsequently decoded repeatedly, resulting in very poor coding performance. This invention efficiently decodes the binarization results by selectively decoding the syntax elements using the correlation established in the binarization scheme.

A context-based adaptive binary arithmetic coding engine comprises two parts, context modeling and an arithmetic coding engine. The binary arithmetic coding engine usually decodes a symbol based on the current probability estimate of the symbol. The probability of a symbol is estimated in certain context in order to achieve good compression ratio. The context modeling in a compression system is to define various coding contexts in order to achieve the best possible compression performance.

In H.264, certain contexts and arithmetic coding engine have been defined to code the syntax elements and coefficients into a non-scalable compressed bit stream. This invention addresses the issue of how to generate and decode a scalable bit stream based on the binarization results generated by algorithms such as those described in U.S. patent application Ser. No. 10/797,467, reusing most coding contexts already defined in H.264, and defining new contexts when there are clear advantages of doing so. Another appealing feature of this invention is that it is not necessary to modify the basic arithmetic coding engine in H.264.

The entropy coding scheme of the present invention is an efficient engine to code into a scalable bit stream the data generated by a binarization scheme such as, for example, that of U.S. patent application Ser. No. 10/797,467 entitled "Method and System for Scalable Binarization of Video Data", filed on Mar. 9, 2004, the entire contents of which are incorporated herein by reference. Those skilled in the art will understand that other binarization schemes are available and that the present invention can be used with them.

Here the entropy coding scheme based on H.264 is described, although the applicability of the present invention is not limited to H.264 based scalable video coding schemes. Similar extensions to other standards are possible when similar binarization algorithms are used.

In the discussion below, a "base layer" could mean the absolute base layer, possibly generated by a non-scalable codec such as H.264, or it could mean a previously-encoded enhancement layer that is used as the basis in decoding the current enhancement layer. The term "coefficient" below refers to either a quantized coefficient value, or to bits produced using a binarization scheme that progressively describes the coefficient with greater precision.

General Decoding Hierarchy in H.264

H.264 decodes the coefficients in the hierarchy described blow.

1. A frame of video data is partitioned into macro blocks (MB). An MB consists of a 16×16 luminance values, a 8×8 chrominance-Cb values, and a 8×8 chrominance-Cr values. An MB skipping flag is set in this level if all the information of this macro block can be inferred from the information that is already decoded, by using pre-defined rules.

2. If the macro block is not skipped, a Coded Block Pattern (CBP) is decoded from the bit stream to indicate the distribution of the non-zero coefficients in the macro block. Further explanation regarding CBP appears below.

3. After a CBP is decoded, a coded block flag is decoded from the bit stream in the next level for either 4×4 blocks or 2×2 blocks (depending on the coefficient type) to indicate whether there are any non-zero coefficients in the block.

4. If there are any non-zero coefficients in a block of size 4×4, or of size 2×2 for chroma DC coefficients, the positions, as well as the values, of those non-zero coefficients are decoded, and the value of each coefficient in a block determined using a predefined scanning order.

Next is described how these syntax elements are decoded from a scalable video coding (SVC) enhancement layer in accordance with the present invention.

Decoding of MB Skipping Flag

An MB can be skipped, i.e. neither coded into a bit stream nor decoded from a bit stream, if the mode and motion vectors can be inferred from the information already decoded, and the encoded version contains no nonzero coefficients. Whether or not an MB is to be skipped is indicated by the MB skipping flag.

In the present invention, an MB skipping flag is decoded from the enhancement layer only if the corresponding MB in the base layer is determined to have no non-zero coefficients. One way this determination is made is by checking whether a MB skipping flag in the base layer indicates that the MB in the base layer is skipped, e.g. the base layer MB skipping flag has a value of 1.

Conversely, when the MB skipping flag of a MB in the base layer indicates that the MB is not skipped, e.g. the MB skipping flag has a value of 0, the corresponding MB in the enhancement layer is not skipped and no MB skipping flag is decoded.

A skipping flag in enhancement layer is decoded in the context of skipping flags of the neighboring MBs at enhancement layer. The same coding contexts defined in H.264 are used.

Figure 2:
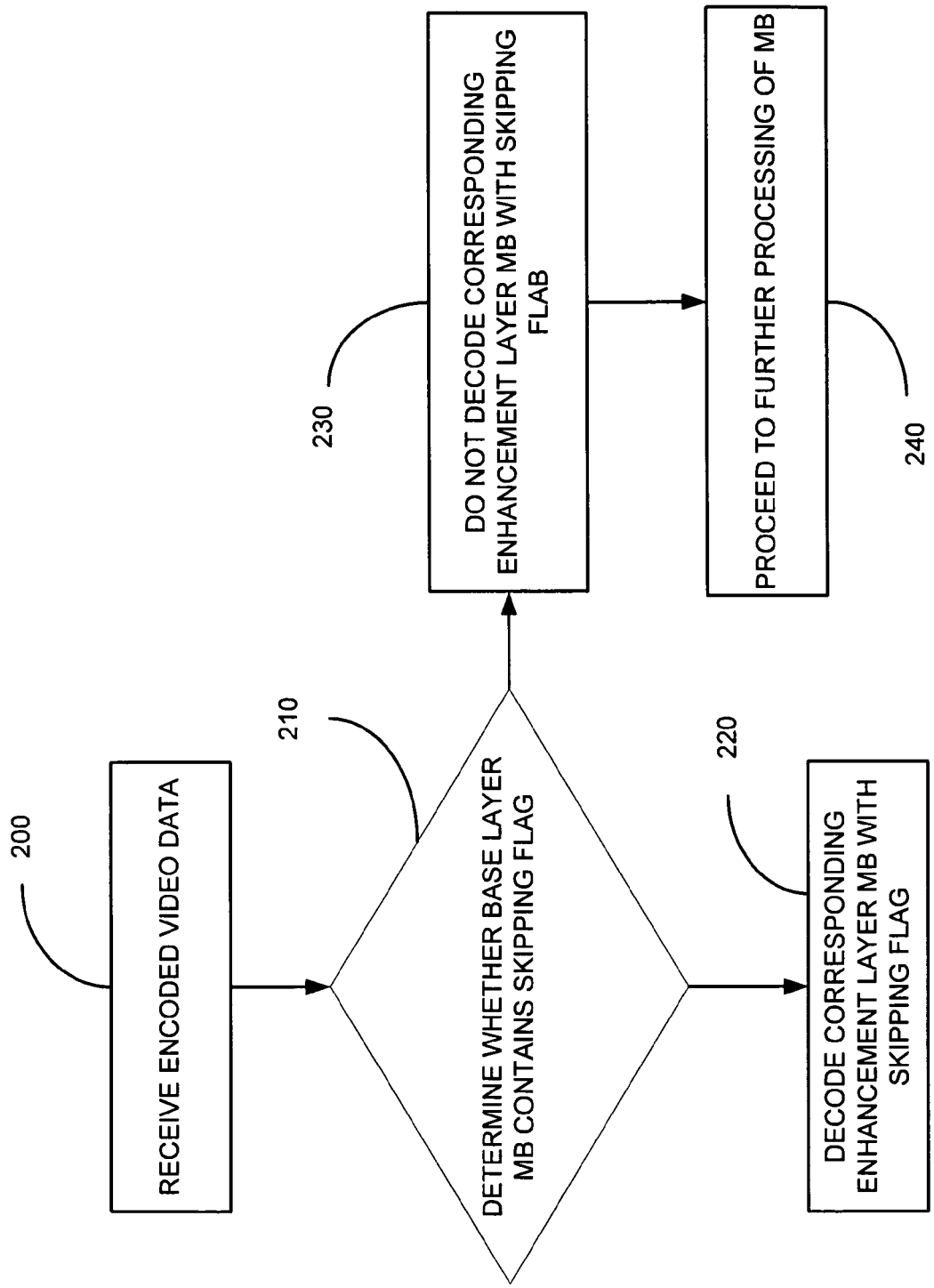
FIG. 2 is a flow chart illustrating a method of a first exemplary embodiment of the invention.

FIG. 2 is a flow chart illustrating this aspect of the invention. In block 200, the encoded video data is received. In block 210, it is determined whether a given base layer MB contains a skipping flag, or more generally, whether it contains no no-zero coefficients. If so, then in block 220, the corresponding enhancement layer MB is decoded with a skipping flag and the method repeats with the next MB. If not, then in block 230, the corresponding enhancement layer MB is not decoded with a skipping flag and the method proceeds to block 240 with further processing of the given MB.

Decoding of MB Coded Block Pattern (CBP)

The MB coded block pattern has two parts, CBPY and CBPC. CBPY consists of four bits indicating which 8×8 luminance blocks among four 8×8 luminance blocks in an MB contain non-zero coefficients. CBPC is, in the preferred embodiment, a number in the range 0-2 that indicates the presence of non-zero chroma (either Cb or Cr) coefficients in the MB, in accordance with the scenarios described below. Other scenarios are of course possible and would result in different coded block patterns and possibly a different range of numbers. A "terminating value" for a CBPY or CBPC is the scenario that conveys the maximum amount of information about the coefficients in the MB that a scheme will allow. In the scenarios described below the terminating value for CBPC is 2.

1. A CBPC value of 0 indicates that there are no non-zero DC or AC coefficients in either chrominance block.

2. A CBPC value of 1 indicates that one or more DC coefficients are non-zero, and all AC coefficients are zero.

3. A CBPC value of 2 indicates that some AC coefficients are non-zero irrespective of DC values.

In the present invention, CBPY bits at an enhancement layer are decoded selectively. Bits are decoded only for those 8×8 luma blocks whose CPB bits are zero, i.e., they have no non-zero coefficients, in the base layer. When the corresponding 8×8 base layer luma block does contain non-zero coefficients, the 8×8 luma block in the enhancement layer is decoded as though it had a CBP value of 1, but no CPB value is decoded.

The CBPY bits that are decoded from the bit stream are decoded in the context of CBPY bits of the neighboring MBs. The same coding context definition as H.264 is used.

In the preferred embodiment, the number of bits in the CBPY so decoded is equal to the number of 8×8 blocks within corresponding MBs at previous layers with non-zero coefficients, but this need not necessarily be the case.

CBPC in the enhancement layer is also defined dependent on a base layer.

1. If CBPC of an MB in the base layer is 0, the H.264 CBPC definition and coding context definitions are used for CBPC of this MB in the enhancement layer.

2. If CBPC of an MB in base layer is 1, since CBPC of the MB in the enhancement layer can only be either 1 or 2, it is only necessary to decode one bit to indicate whether the CBPC of the MB in the enhancement layer is equal to 1 or not. The same context definition as in H.264 is used for this bit.

3. If CBPC of an MB in base layer is 2, CBPC of the MB in the enhancement layer is also 2, but in this scenario the CBPC value is not decoded.

Decoding of Coded Block Flag

There are five different types of blocks in the actual coefficient decoding. They are luma 4×4 AC block from intra 4×4 prediction, luma 4×4 DC block from intra 16×16 prediction, luma 4×4 AC block from intra 16×16 prediction, chroma 4×4 AC block, and chroma 2×2 DC block. In H.264, a coded block flag decoded from the bit stream indicates whether a block contains any non-zero coefficients. This flag can have values 0 or 1; a value of 0 indicates that there are no non-zero coefficients, while a value of 1 indicates that there is at least one non-zero coefficient in the block.

In this invention, the definition of coded block flag is extended for the enhancement layer. If the corresponding block in the base layer has no non-zero coefficients (i.e., if the corresponding coded block flag in the base layer is 0), the normal coded block flag definition is used. This is referred to as a type-1 coded block flag. For type-1 coded block flags, the same coding contexts defined in H.264 are used.

The case where a corresponding block in the base layer has some non-zero coefficients is further divided into two cases. When the corresponding block in the base layer contains at least one zero-value coefficient, a coded block flag referred to as a type-2 coded block flag is decoded. When the corresponding block in the base layer contains only non-zero coefficients, no coded block flag is decoded, as it is impossible for any coefficients to change from being zero in the base layer to non-zero in the enhancement layer.

If the type-2 coded block flag is 0, there are no new nonzero coefficients in the enhancement layer. If the flag is 1, this indicates that more coefficients have become nonzero.

Type-2 coded block flags have different statistics from the normal coded block flag. New contexts for encoding the type-2 coded flag are defined. The new contexts are defined based on the number of non-zero coefficients in the block in the base layer, the size of the block, and the conditions of the neighboring blocks.

Decoding of Coefficients

In H.264, a coefficient can only be zero or non-zero. In scalable video coding, a coefficient is successively refined. There are three cases regarding a coefficient's value in the enhancement layer.

1. The coefficient is zero both in the base and in the enhancement layer.

2. The coefficient is zero in the base layer, but non-zero in the enhancement layer. This case happens when the coefficient has been correctly predicted in the base layer, but not in the enhancement layer. For this case, a significance map determines the position of the coefficient. In addition, the sign of the coefficient needs to be decoded.

3. The coefficient is nonzero in the base layer, and information is decoded from the enhancement layer bit stream to make the decoded coefficient more accurate. The additional information coded into the enhancement layer for this coefficient is called refinement information.

Decoding of Significant Coefficient Map and Size of New Significant Coefficients In H.264, locations of nonzero coefficients are decoded using two flags, significant_coeff_flag and last_significant_coeff_flag. The flags are decoded in the scanning order defined in H.264. A decoded significant_coeff_flag of value 1 indicates a nonzero coefficient at the current scanning position. A decoded significant_coeff_flag of value 0 indicates a zero coefficient at the current scanning position. Flag last_significant_coeff_flag is decoded only if significant_coeff_flag is 1. If the value of last_significant_coeff_flag is 0, there are more nonzero coefficients following the current coefficient in the scanning order. If the value of last_significant_coeff flag is 1, no more non-zero coefficients follow the current coefficient in the scanning order.

In the present invention, significant_coeff_flag in the enhancement layer is decoded only for the coefficients that are zero in the base layer. The same coding contexts defined in H.264 could be used.

In the present invention, last_significant_coeff_flag is defined similarly as in the base layer. The same coding contexts defined in H.264 could be used. New contexts could also be formed based on the number of non-zero coefficients in the base layer, and the block size.

If a coded block flag is zero, irrespective of whether it is type-1 or type-2, decoding of the significant coefficient map is not necessary.

Decoding of Coefficient Refinement Information

Coefficient refinement information is coded into the enhancement layer for those coefficients that are non-zero in the base layer. A refinement bit indicates how to refine a coefficient to a higher fidelity.

In the binarization scheme presented in the afore-mentioned U.S. patent application Ser. No. 10/797,467, the bit stream may not incorporate any refinement bits at all if the coefficient is already of comparatively high accuracy. Conversely, the enhancement layer bit stream could also incorporate more than 1 refinement bit to refine a single coefficient that is of comparatively low accuracy.

There is no corresponding part in H.264 for the coefficient refinement bits. New coding contexts are defined. The contexts are defined based on the position of the predicted value with respect to the interval in the binarization scheme used to provide the input. The contexts could also be defined considering the size of the interval.

The invention can be implemented directly in software using any common programming language, e.g. C/C++ or assembly language. This invention can also be implemented in hardware and used in consumer devices.

One possible implementation of the present invention is as part of a communication device (such as a mobile communication device like a cellular telephone, or a network device like a base station, router, repeater, etc.). A communication device 130, as shown in FIG. 1, comprises a communication interface 134, a memory 138, a processor 140, an application 142, and a clock 146. The exact architecture of communication device 130 is not important. Different and additional components of communication device 130 may be incorporated into the communication device 130. For example, if the device 130 is a cellular telephone it may also include a display screen, and one or more input interfaces such as a keyboard, a touch screen and a camera. The scalable video encoding techniques of the present invention would be performed in the processor 140 and memory 138 of the communication device 130.

Figure 3:
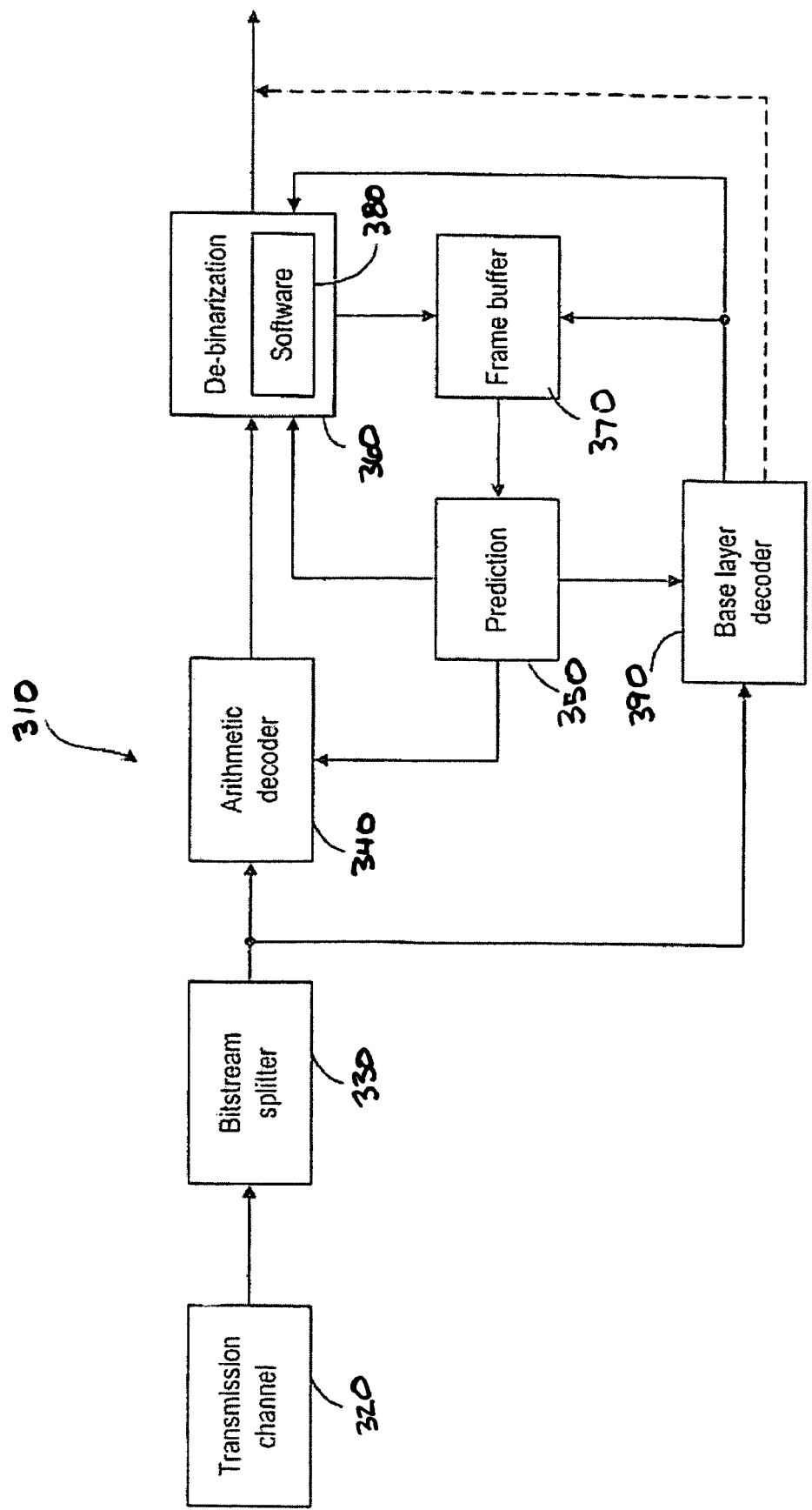
FIG. 3 illustrates a video decoder employing the present invention.

FIG. 3 illustrates a video decoder 310 that uses a coefficient binarization process and decodes a scalable bit stream in accordance with the present invention. As shown, the video decoder 310 received a bitstream from a transmission channel 320 for video decoding. The decoder 310 can include a bitstream splitter 330 for processing the bitstream, such as by removing bits from the bitstream so as to reduce the bitrate. The processed bistream can be provided to an arithmetic decoder 340, along with prediction information from a prediction block 350. The arithmetic decoder 340 can provide signals indicative of decoded video data to a debinarization block 360 for video reconstruction. The de-binarization block 360 can be operatively connected to the prediction block 350 to receive prediction information. The de-binarization block 360 can provide reconstructed coefficient information to a frame buffer 370 and can provide reconstructed video signals to a media player (not shown). It is understood that the de-binarization block 360 can include a software program 380 to carry out the functions of the de-binarization block. Furthermore, the video decoder 310 may comprise a base layer decoder 390 operatively connected to the prediction block 350, the frame buffer 370, and the de-binarization block 360 to carry out base layer decoding based on the video data from the bitstream. Base layer decoder 390 is known in the art.

The present invention can also be implemented in an encoder is a manner very similar to a decoder. Most of the inputs needed under the present invention are available to both encoders and decoders of a given bit stream.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module" as used herein and in the claims is intended to encompass implementations using one or more lines of software code, and/or hardware implementations, and/or equipment for receiving manual inputs.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principals of the present invention and its practical application to enable one skilled in the art to utilize the present invention in various embodiments and with various modifications as are suited to the particular use contemplated.

What is claimed is:

1. A method of decoding a scalable bit stream comprising encoded video data, said method comprising:
   determining whether a base layer macro block of said video data contains no non-zero coefficients;
   decoding, with a decoder, a skipping flag for an enhancement layer macro block of said video data, corresponding to said base layer macro block, only if it is determined that said base layer macro block contains no non-zero coefficients; and
   decoding, with a decoder, said enhancement layer macro block without decoding a skipping flag if it is determined that said base layer macro block contains at least one non-zero coefficient.

2. A method of decoding a scalable bit stream according to claim 1, wherein the determination of whether said base layer macro block contains no non-zero coefficients is made by checking whether a skipping flag in said base layer macro block contains one of a predetermined set of values.

3. A method of decoding a scalable bit stream according to claim 2, wherein said skipping flag in the enhancement layer macro block is decoded using the same context as that of neighboring enhancement layer macro blocks.

4. A method of decoding a scalable bit stream according to claim 2, wherein an arithmetic coder is used to decode said skipping flag in said enhancement layer macro block.

5. A method of decoding a scalable bit stream according to claim 4, wherein said arithmetic coder is context based and context selection is based on macro block skipping flag values from neighboring enhancement layer macro blocks.

6. A method of decoding a scalable bit stream comprising encoded video data, said method comprising:
   determining which of a plurality of blocks in a base layer macro block contain zero coefficients;
   decoding, with a decoder, an abbreviated coded block pattern (CBP) for an enhancement layer macro block, said abbreviated CBP comprising a number of digits equal to the number of blocks in said base layer macro block containing only zero coefficients; and
   generating a complete CBP for the enhancement layer macro block, said complete CBP formed by inserting into said abbreviated CBP digits corresponding to the number of blocks in said base layer macroblock containing non-zero coefficients.

7. A method of decoding a scalable bit stream comprising encoded video data, according to claim 6, wherein said determination is made by analyzing a CPB of said base layer macro block.

8. A method of decoding a scalable bit stream according to claim 6, wherein an arithmetic coder is used to decode the abbreviated CBP.

9. A method of decoding a scalable bit stream according to claim 8, wherein said arithmetic coder is context based and context selection is based on CBP values from macro block neighboring the enhancement layer macro block.

10. A method of decoding a scalable bit stream comprising encoded video data, said method comprising:
    decoding, with a decoder, a coded block pattern (CBP) value of a base layer macro block; and
    decoding, with a decoder, a differential coded block pattern (CBP) value of an enhancement layer macro block; and
    forming a coded block pattern for said enhancement layer macro block by adding said decoded differential coded block pattern to said coded block pattern of said base layer macro block.

11. A method of decoding a scalable bit stream according to claim 10, wherein an arithmetic coder is used to decode the CBP values.

12. A method of decoding a scalable bit stream according to claim 11, wherein said arithmetic coder is context based and context selection is based on CBP values from macro block neighboring the enhancement layer macro block.

13. A method of decoding a scalable bit stream according to claim 10, wherein a CBP value is not decoded from the bit stream for an enhancement layer macro block if the CBP value of the base layer macro block has attained a terminating value.

14. A method of decoding a scalable bit stream comprising encoded video data, said method comprising:
    Determining the zero-value coefficients in a block of a base layer; and
    decoding, with a decoder, a coded block flag for a corresponding block of an enhancement layer only when said determination indicates that said block in said base layer contains only zero-value coefficients.

15. A method of decoding a scalable bit stream according to claim 14, wherein the coded block flag for an enhancement layer block is only decoded when at least one coefficient from the corresponding base layer block is zero.

16. A method of decoding a scalable bit stream according to claim 15, wherein a coded block flag for an enhancement layer block is decoded from a bit stream, and a determination is made as to whether any zero-value coefficients in a base layer block become non-zero coefficients in a corresponding enhancement layer block based on the value of said decoded coded block flag.

17. A method of decoding a scalable bit stream comprising encoded video data, said method comprising:
    determining for each coefficient in a base layer block, whether said coefficient is zero; and
    decoding, with a decoder, a significance digit for coefficient in an enhancement layer block corresponding to said base layer block; and
    determining, for each coefficient in said enhancement layer block, whether said enhancement layer coefficient is zero based on the results of said determination and said decoding.

18. A method of decoding a scalable bit stream according to claim 17, wherein coefficient information is only decoded when the significance digit is of a particular value.

19. A method of decoding a scalable bit stream according to claim 18, wherein an arithmetic coder is used to decode the significance digits.

20. A method of decoding a scalable bit stream according to claim 18, wherein a terminating digit is decoded following each decoded significance digit indicating a transition from a zero to non-zero coefficient, said terminating digit indicating whether any coefficients positioned later in the enhancement layer block according to a scan order transition from being zero to non-zero.

21. A method of decoding a scalable bit stream according to claim 20, wherein an arithmetic encoder is used to decode the terminating digits.

22. A method of decoding a scalable bit stream according to claim 21, wherein context selection is based at least in part on the number of non-zero coefficients in the base layer.

23. A method of decoding a scalable bit stream according to claim 21, wherein context selection is based at least in part on the size of the block being encoded.

24. A method of decoding a scalable bit stream according to claim 20, wherein context selection is based, at least in part, on both the number of non-zero coefficients in the base layer and on the size of the block being encoded.

25. A method of decoding a scalable bit stream comprising encoded video data, said method comprising:
decoding, with a decoder, zero or more refinement bits in an enhancement layer for each non-zero coefficient from a base layer block using an entropy coder; and
determining a refined value for said non-zero coefficient, according to a binarization method.

26. A method of decoding a scalable bit stream according to claim 25, wherein an arithmetic coder is used to decode the refinement bits.

27. A method of decoding a scalable bit stream according to claim 26, wherein contexts are defined at least partly based on the position of a predicted value for the coefficient with respect to a bounding interval.

28. A method of decoding a scalable bit stream according to claim 26, wherein contexts are defined at least partly based on the size of a bounding interval surrounding the refined coefficient value.

29. A program product, embodied on a computer readable medium, for decoding a scalable bit stream comprising encoded video data, said program product containing machine readable program code for causing, when executed, one or more machines to perform the following:
determining whether a base layer macro block of said video data contains no non-zero coefficients;
decoding a skipping flag for an enhancement layer macro block of said video data, corresponding to said base layer macro block, only if it is determined that said base layer macro block contains no non-zero coefficients; and
decoding said enhancement layer macro block without a skipping flag if it is determined that said base layer macro block contains at least one non-zero coefficient.

30. A program product for decoding a scalable bit stream according to claim 29, wherein the determination of whether said base layer macro block contains no non-zero coefficients is made by checking whether a skipping flag in said base layer macro block contains one of a predetermined set of values.

31. A program product for decoding a scalable bit stream according to claim 29, wherein said skipping flag in the enhancement layer macro block is decoded using the same context as that of neighboring enhancement layer macro blocks.

32. A program product for decoding a scalable bit stream according to claim 29, wherein an arithmetic coder is used to decode said skipping flag in said enhancement layer macro block.

33. A program product for decoding a scalable bit stream according to claim 32, wherein said arithmetic coder is context based and context selection is based on macro block skipping flag values from neighboring enhancement layer macro blocks.

34. A program product, embodied on a computer readable medium, for decoding a scalable bit stream comprising encoded video data, said program product containing machine readable program code for causing, when executed, one or more machines to perform the following:
determining which of a plurality of blocks in a base layer macro block contain zero coefficients;
decoding an abbreviated coded block pattern (CBP) for an enhancement layer macro block, said abbreviated CBP comprising a number of digits equal to the number of blocks in said bask layer macro block containing only zero coefficients; and
generating a complete CBP for the enhancement layer, said complete CBP formed by inserting into said abbreviated CBP digits corresponding to the number of blocks in said bask layer macro block containing non-zero coefficients.

35. A program product for decoding a scalable bit stream comprising encoded video data, according to claim 34, wherein said determination is made by analyzing a CPB of said base layer macro block.

36. A program product for decoding a scalable bit stream according to claim 34, wherein an arithmetic coder is used to decode the abbreviated CBPs.

37. A program product for decoding a scalable bit stream according to claim 36, wherein said arithmetic coder is context based and context selection is based on CBP values from macro block neighboring the enhancement layer macro block.

38. A program product, embodied on a computer readable medium, for decoding a scalable bit stream comprising encoded video data, said program product containing machine readable program code for causing, when executed, one or more machines to perform the following:
decoding a coded block pattern (CBP) value of a base layer macro block; and
decoding a differential coded block pattern (CBP) value of an enhancement layer macro block relative to said coded block pattern of said base layer macro block; and
forming a coded block pattern for said enhancement layer macro block by adding said decoded differential coded block pattern to said coded block pattern of said base layer macro block.

39. A program product for decoding a scalable bit stream according to claim 38, wherein an arithmetic coder is used to decode the CBP values.

40. A program product for decoding a scalable bit stream according to claim 39, wherein said arithmetic coder is context based and context selection is based on CBP values from macro block neighboring the enhancement layer macro block.

41. A program product for decoding a scalable bit stream according to claim 38, wherein a CBP value is not decoded from the bit stream for the enhancement layer macro block if the CBP value of the base layer macro block has attained a terminating value.

42. A program product, embodied on a computer readable medium, for decoding a scalable bit stream comprising encoded video data, said program product containing machine readable program code for causing, when executed, one or more machines to perform the following:
determining the zero-value coefficients in a block of a base layer; and
decoding a coded block flag for a corresponding block of an enhancement layer only when said determination indicates that said block in said base layer contains only zero-value coefficients.

43. An apparatus configured to decode a scalable bit stream comprising encoded video data, said apparatus comprising:
a processor configured to determine whether a base layer macro block of said video data contains no non-zero coefficients;
a decoder configured to decode a skipping flag for an enhancement layer macro block of said video data, corresponding to said base layer macro block, only if it is determined that said base layer macro block contains no non-zero coefficients; and a decoder configured to decode said enhancement layer macro block without a skipping flag if it is determined that said base layer macro block contains at least one non-zero coefficient.

44. An apparatus configured to decode a scalable bit stream comprising encoded video data, said apparatus comprising:

a processor configured to determine which of a plurality of blocks in a base layer macro block contain zero coefficients;

a processor configured to decode an abbreviated coded block pattern (CBP) for an enhancement layer macro block, said abbreviated CBP comprising a number of digits equal to the number of blocks in said base layer macro block containing only zero coefficients; and a processor configured to generate a complete CBP for the enhancement layer macro block, said complete CBP formed by inserting into said abbreviated CBP digits corresponding to the number of blocks in said base layer macro block containing non-zero coefficients.

45. An apparatus configured to decode a scalable bit stream comprising encoded video data, said apparatus comprising:

a decoder configured to decode a coded block pattern (CBP) value of a base layer macro block; and a decoder configured to differentially decode a coded block pattern (CBP) value of an enhancement layer macro block to form a decoded differential CBP;

a processor configured to form a coded block pattern for said enhancement layer macro block by adding said decoded differential CBP to said coded block pattern of said base layer macro block.

46. An apparatus configured to decode a scalable bit stream comprising encoded video data, said apparatus comprising:

a processor configured to determine the zero-value coefficients in a block of a base layer; and configured to decode a coded block flag for a corresponding block of an enhancement layer only when said determination indicates that said block in said base layer contains only zero-value coefficients.

47. An apparatus configured to encode a scalable bit stream comprising binarized video data, said apparatus comprising:

a processor configured to determine whether a base layer macro block of said video data contains no non-zero coefficients; and an encoder configured to encode a skipping flag for an enhancement layer macro block of said video data, corresponding to said base layer macro block, only if it is determined that said base layer macro block contains no non-zero coefficients.

48. An apparatus configured to encode a scalable bit stream comprising binarized video data, said apparatus comprising:

a processor configured to determine which of a plurality of blocks in a base layer macro block contain zero coefficients;

a processor configured to encode a coded block pattern (CBP) of an enhancement layer macro block, said CBP comprising a number of digits equal to the number of blocks in said base layer macro block containing only zero coefficients.

49. An apparatus configured to encode a scalable bit stream comprising binarized video data, said apparatus comprising:

a processor configured to encode a coded block pattern (CBP) value of a base layer macro block; and a processor configured to compute the coded block pattern (CBP) value of an enhancement layer macro block corresponding to said base layer macro block; and a processor configured to encode a value corresponding to the difference between said coded block pattern of said enhancement layer macro block and said coded block pattern of said base layer macro block.

50. An apparatus configured to encode a scalable bit stream comprising binarized video data, said apparatus comprising:

a processor configured to determine the zero-value coefficients in a block of a base layer; and a processor configured to encode a coded block flag for a corresponding block of an enhancement layer only when said determination indicates that said block in said base layer contains only zero-value coefficients.

* * * * *